United States Patent
Boles et al.

(10) Patent No.: US 6,443,230 B1
(45) Date of Patent: Sep. 3, 2002

(54) ORGANIC HYDROFLUORIC ACID SPEARHEAD SYSTEM

(75) Inventors: Joel Lynn Boles, Spring, TX (US); Marty Usie, Youngsville, LA (US)

(73) Assignee: BJ Services Company, Houston, TX (US)

( * ) Notice: Subject to any disclaimer, the term of this patent is extended or adjusted under 35 U.S.C. 154(b) by 118 days.

(21) Appl. No.: 09/599,024

(22) Filed: Jun. 21, 2000

Related U.S. Application Data

(60) Provisional application No. 60/140,383, filed on Jun. 22, 1999.

(51) Int. Cl.$^7$ ................................................ E21B 43/27
(52) U.S. Cl. ....................................... 166/307; 166/308
(58) Field of Search ................................ 166/270, 300, 166/305.1, 307, 308, 400; 507/240, 923

(56) References Cited

U.S. PATENT DOCUMENTS

| | | | | |
|---|---|---|---|---|
| 3,953,340 A | * | 4/1976 | Templeton et al. | |
| 4,414,118 A | * | 11/1983 | Murphey | |
| 4,518,070 A | * | 5/1985 | Middleton | |
| 4,561,503 A | * | 12/1985 | Wong | |
| 4,599,182 A | * | 7/1986 | Young et al. | |
| 4,605,068 A | * | 8/1986 | Young et al. | |
| 4,646,835 A | * | 3/1987 | Watkins et al. | |
| 5,039,434 A | * | 8/1991 | Watkins et al. | |
| 5,529,125 A | | 6/1996 | Di Lullo Arias et al. ... | 166/307 |

* cited by examiner

*Primary Examiner*—Roger Schoeppel
(74) *Attorney, Agent, or Firm*—Bracewell & Patterson, LLP

(57) ABSTRACT

A method of enhancing the productivity of hydrocarbons from hydrocarbon bearing siliceous formations, particularly those made up at least in part of zeolites, is achieved by contacting the formation with a treatment solution comprising citric acid, phosphonate compounds, and hydrofluoric acid. The treatment solution can be applied prior to gravel packing or fracturing. This solution may optionally contain ammonium salts. Similar solutions comprising citric acid and phosphonate compounds without hydrofluoric acid may also be used to contact the formation prior to contacting the formation with the citric acid and phosphonate solution containing hydrofluoric acid. Other preflushes known in the art, such as hydrochloric, acetic or formic acid solutions, may also be used.

17 Claims, No Drawings

ORGANIC HYDROFLUORIC ACID SPEARHEAD SYSTEM

CROSS REFERENCE TO RELATED APPLICATIONS

Benefit is herein claimed of the filing date under 35 U.S.C. §119 and/or §120 and 37 C.F.R. §1.78 to U.S. Provisional Patent Application Serial No. 60/140,383, filed on Jun. 22, 1999, entitled "Organic Hydrofluoric Acid Spearhead System."

FIELD OF THE INVENTION

The invention relates to a method of treating siliceous formations to increase the permeability of the formations.

DESCRIPTION OF THE PRIOR ART

Subterranean sandstone or siliceous formations in oil and gas wells have been treated in the past with acid treatments to increase their permeability thus increasing or improving production from the formation. As used herein the term "siliceous" refers to the characteristic of having silica and/or silicate. Most sandstone formation are composed of over 70% sand quartz particles, i.e., silica ($SiO_2$), bonded together by various amounts of cementing material including carbonate (calcite or $CaCO_3$) and silicates.

The acid treatment of siliceous formations should be distinguished from the acid treatment of carbonate formations. Carbonate formations can be treated with a variety of acid systems, including hydrochloric, acetic and formic aids, with usually equal success. The treatment of siliceous formations with these acids, however, has little or no effect because they do not react appreciably with the silica and silicates which characterize the sandstone formations.

By far the most common method of treating sandstone formations involves introducing hydrofluoric acid into the wellbore and allowing the hydrofluoric acid to react with the surrounding formation. Hydrofluoric acid is preferred almost uniformly because of its reactivity with silica and silicates. The silicates include such things as clays and feldspars. Hydrofluoric acid tends to react very quickly with authigenic clays, such as smectite, kaolinite, illite and chlorite, especially at temperatures above 150° F. as commonly found in subterranean formations. Because of this quick reaction, the hydrofluoric acid penetrates only a few inches of the formation before it is spent. Simultaneously, various alumina and/or silicate complexes precipitate as a result of the reaction of the hydrofluoric acid with the clays and silts. Such precipitation tends to plug pore spaces and reduce the porosity and permeability of the formation, thus impairing hydrocarbon flow potential. Further, because clays are normally a part of the cementitious material that holds the sandgrains of sandstone formations together, the dissolution of clay also weakens and unconsolidates the sandstone matrix in the vicinity of the wellbore, thus causing damage to the formation. The damaging effects due to both the unconsolidation of the matrix and the precipitation of complexes which clog the pore spaces of the formation can eliminate or even revert the stimulation effect of the acid treatment.

U.S. Pat. No. 5,529,125 teaches a useful method of treating siliceous or sandstone formations using hydrofluoric acid which reduces the amount of precipitates produced and which inhibits or retards the reactivity of the hydrofluoric acid with the clay or silicate elements of the formation. In this method, the formation is contacted with a treatment solution containing a phosphonate compound and a source of hydrofluoric acid.

However, certain siliceous formations contain aluminosilicates, such as zeolites, that are especially sensitive to hydrofluoric acid and tend to form undesirable reactions such as gelatinous precipitates in the presence of hydrofluoric acid. Such precipitates can clog pores of the formation thereby reducing the hydrocarbon productivity of the formation. Thus, a method of treating these especially sensitive formations is still needed.

SUMMARY OF THE INVENTION

A method of enhancing the productivity of hydrocarbons from hydrocarbon bearing siliceous formations, particularly those comprising aluminosilicates and most particularly those comprising zeolites, is achieved by contacting the formation with a treatment solution comprising citric acid, phosphonate compounds, and hydrofluoric acid. The advantages of this method are especially achieved when such treatment solution is applied prior to gravel packing or fracturing. This solution may optionally contain ammonium salts. Alternatively, similar solutions comprising citric acid and phosphonate compounds without hydrofluoric acid may be used to contact the formation prior to contacting the formation with the citric acid and phosphonate solution containing hydrofluoric acid. Other preflushes known in the art, such hydrochloric, acetic or formic acid solutions, may also be used.

Additional objects, features and advantages will be apparent in the written description which follows.

DETAILED DESCRIPTION OF THE INVENTION

We have discovered that hydrocarbon production from hydrocarbon bearing siliceous formations containing aluminosilicates such as zeolites that are very sensitive to hydrofluoric acid can benefit from the stimulating effects of acid treatment and even hydrofluoric acid when such acid is included in the treatment solution of this invention. That is, we have discovered a treatment solution and system for stimulating these sensitive formations without resulting in gelatinous precipitates commonly seen with prior art techniques.

In the method or system of this invention, a treatment solution is prepared comprising about 1% to about 50% citric acid-most preferably about 10% citric acid, about 1% to about 50% phosphonate compound(s), and up to about 10% hydrofluoric acid-most preferably about 0.5% to about 6% hydrofluoric acid. Ammonium chloride salts may optionally be included in the solution in any desired amount up to saturation.

The preferred phosphonate compound for this solution is "HV Acid" which is 1-hydroxyethylidene-1,1-diphosphonic acid, available in 60% strength as "DEQUEST 2010" from Monsanto Co. Other phosphonate compounds believed particularly suitable for the solution of the invention are aminotri or methylene phosphonic acid, available in 50% strength as "DEQUEST 2000" from Monsanto Co. and diethylene triamine penta or methylene phosphonic acid available in 50% strength from "DEQUEST 2060" from Monsanto Co. Other phosphonate compounds known for use in acid treatment of sandstone formations are described in, for example, U.S. Pat. No. 5,529,125, and other references and may alternatively be used in the solution of this invention. Such compounds will be familiar to those skilled in the art and include the phosphonic acids and the salts and esters of the phosphonic acids having the general formula:

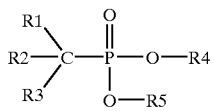

where R1, R2 and R3 may be hydrogen, alkyl, aryl, phosphonates, phosphates, acyl, amine, hydroxy and carboxyl groups, and R4 and R5 may consist of hydrogen, sodium, potassium, ammonium or an organic radical. Examples of these materials include aminotri (methylene phosphonic acid) and its pentasodium salt, 1-hydroxyethylidene-1,1-diphosphonic acid and its tetrasodium salt, hexamethylene diaminetetra (methylene phosphonic acid) and its hexapotassium salt, and diethylenetriamine-penta (methylene phosphonic acid) and its hexasodium salt.

Other materials commonly added to acid treatment solutions may also optionally be added to the treatment solutions of this invention. For example, the solution may include or have added thereto surfactants, iron control agents, foaming agents, anti-sludge agents, mutual solvents, micellar solvents, gelling agents, bactericides, clay stabilizers, fluid loss control agents, diverting agents, and other known additives for formation stimulation.

After formulating a treatment solution containing the citric acid, phosphonate compound(s), and hydrofluoric acid, the solution is then introduced into the formation at the location where stimulation is desired. The greatest advantages of the method are recognized when the formation is contacted with the solution prior to gravel packing or fracturing.

In an alternative embodiment, a solution comprising citric acid and a phosphonate compound without hydrofluoric acid is prepared and used to treat the formation prior to treating the formation with the solution of this invention with hydrofluoric acid. In still another embodiment, a preflush with or without phosphonate solution may be used to treat the formation prior to treatment with the citric acid, phosphonate, hydrofluoric acid solution of this invention.

The reacion of the hydrofluoric acid in the treatment of the solution of this invention with the siliceous formation is a complete reaction, not a partial or a retarded or delayed reaction as seen in prior art methods. However, the reaction according to the method of this invention does not result in gelatinous precipitates. Stimulation and control of potential precipitation of amorphous silicates such as zeolites and clays may be achieved.

The treatment solutions of the invention were tested in the laboratory to determine the solubility of various materials. Specifically, the following acids shown in Table 1 were tested for suitability as solutions for applying to a siliceous formation prior to gravel packing or fracturing according to this invention.

TABLE 1

| Acids Tested | |
| --- | --- |
| Acid No. 1 | 6% HCl-1.5% HF |
| Acid No. 2 | 10% Citric-1.5% HF (made using concentrated HF) |
| Acid No. 3 | Treatment acid of Invention made with Citric Acid, Liquid HF and 15 GPT (or gallons per thousand) "HV Acid) |

TABLE 1-continued

| Acids Tested | |
| --- | --- |
| Acid No. 4 | BJ Services "Half-Strength Acid" (made with Formic Acid, Ammonium Bifluoride and "HV Acid") |
| Acid No. 5 | BJ Services "Half-Strength Acid" (made with Formic Acid, Ammonium Bifluoride and "HV Acid") |
| Acid No. 6 | BJ Services "Half-Strength Acid" (made with Formic Acid, Liquid Acid, Liquid HF and "HV Acid") |
| Acid No. 7 | BJ Services "Half-Strength Acid" (made Same as Acid No. 5) |
| Acid No. 8 | BJ Services "Half-Strength Acid" (made with Acid No. 6) |
| Acid No. 9 | BJ Services "Half-Strength Acid" (made with Acetic Acid, Ammonium Bifluoride and "HV Acid") |
| Acid No. 10 | BJ Services "Half-Strength Acid" (made with Acetic Acid, Liquid HF and "HV Acid") |

Table 1 Notes:
(BJ Services "Half-Strength Acid is made to have the approximately dissolving power of an acid system containing 1.5% HF acid
(2) All the acid systems except for Acid Nos. 1, 5, and 6 contained 5% ammonium chloride by weight;
(3) The Acetic acid used was 99% active and the Formic Acid used was 90% active.

TABLE 2

| Materials Tested | |
| --- | --- |
| Material A | Silica Flour (less than 200 mesh) |
| Material B | Bentonite (Cement Grade) |
| Material C | Formation sample from an offshore well in a siliceous formation containing zeolites |

In solubility testing these acid systems and materials of Tables 1 and 2 respectively above, approximately one gram of the test material was placed into plastic bottles containing 100 milliliters of a test acid. This acid containing the test material was placed into a 150° F. water bath. After three hours the acid and the remaining solids were filtered. The remaining solids were washed and dried. The dried remaining solids were weighed and the percent solubility was calculated. Only test acids nos. 1–4 were tested with all materials, A, B, and C. Acids 5–10 were tested with the formation sand (Material C) only. The results of these tests are shown in Table 3

TABLE 3

| Test Results | | |
| --- | --- | --- |
| TEST FLUID | TEST MATERIAL | PERCENT SOLUBILITY |
| Acid No. 1 | Material A | 19.9% |
| Acid No. 2 | Material B | 27.% |
| Acid No. 3 | Material A | 31.5% |
| Acid No. 4 | Material A | 22.7% |
| Acid No. 1 | Material B | 84.9% |
| Acid No. 2 | Material B | 70.5% |
| Acid No. 3 | Material B | 77.9% |
| Acid No. 4 | Material B | 79.8% |
| Acid No. 1 | Material C | 35.8% |
| Acid No. 2 | Material C | 31.3% |
| Acid No. 3 | Material C | 32.4% |
| Acid No. 4 | Material C | 34.4% |
| Acid No. 5 | Material C | 39.2% |
| Acid No. 6 | Material C | 41.7% |

TABLE 3-continued

Test Results

| TEST FLUID | TEST MATERIAL | PERCENT SOLUBILITY |
|---|---|---|
| Acid No. 7 | Material C | 28.6% |
| Acid No. 8 | Material C | 32.6% |
| Acid No. 9 | Material C | 23.2% |
| Acid No. 10 | Material C | 37.1% |

These results show that the organic HF acid systems dissolved a larger amount of silica flour than the typical HCl-1.5% HF acid system did. They also show that the typical HCl-HF acid system did dissolve more of the Bentonite material than the organic HF acid systems. Further, the results show that the solubility of the formation samples was approximately the same in the majority of the acid tested. The major exception was the system made with concentrated acetic acid and ammonium bifluoride. That system dissolved the least amount of the formation sample.

A further laboratory test was done with four samples comparing the effect of several acid systems on zeolite. In each case, a particular acid sample was placed in a bottle containing zeolite. The first bottle contained 30 cc of 15% HCl with 3 gr. Zeolite. A rigid gel formed. The second bottle contained 10% citric acid and 1.5% HF and 5% $NH_4Cl$ with 3 gr. zeolite. A rigid gel formed. The third bottle contained 6% HCl and 1.5% HF with 3 gr. zeolite. A rigid gel formed. The fourth and last bottle contained the preferred acid treatment solution of this invention with 3 gr. zeolite. A gel did not form and the viscosity did not increase and the solution remained thin for the entire test period of over seven weeks.

Thus, the test indicates that the acid systems of this invention have the effectiveness of stimulating a siliceous formation comparable to known acid systems but have the distinct advantage of providing such stimulation without causing harmful precipitates or gelling of zeolites in the formation. Further, we have found that the stimulation is enhanced when the treatment solutions spearhead or precede gravel packing or fracturing techniques.

The treatment solutions of the invention were further tested in the laboratory to determine the solubility on various materials with the acid treatment of the invention and with regular HCl-HF Acids. Test conditions were two hours contact at 150° F. (static). Specifically, the following acids and materials were tested including core specimens from the region used as the case history to follow:

TABLE 4

Acids Tested

| Acid No. 1 | 0% CITRIC + 1.5% HF + 5% AMMONIUM CHLORIDE (1.5% HV) |
| Acid No. 2 | 10% CITRIC + 2.0% HF + 5% AMMONIUM CHLORIDE (1.5% HV) |
| Acid No. 3 | 10% CITRIC + 3.0% HF + 5% AMMONIUM CHLORIDE (1.5% HV) |
| Acid No. 4 | 10% CITRIC + 5% FORMIC + 2% HF + 5% AMMONIUM CHLORIDE (1.5% HV) |
| Acid No. 5 | 9% HCl + 1% HF + 5% AMMONIUM CHLORIDE |
| Acid No. 6 | 13% HCl + 1.5% HF + 5% AMMONIUM CHLORIDE |
| Acid No. 7 | 12% HCl + 3% HF + 5% AMMONIUM CHLORIDE |
| Acid No. 8 | 15% HCl + 5% AMMONIUM CHLORIDE |

TABLE 5

Materials Tested

| Material A | CEMENT GRADE BENTONITE |
| Material B | SILICA FLOUR {LESS THAN 200 MESH} |
| Material C | SODIUM RICH CLINOPTILOTIE |
| Material D | COMPOSITE SIDEWALL CORE SPECIMENS FROM MAIN PASS FIELD (DEPTH 8647 & 868 FEET) |
| Material E | COMPOSITE SIDEWALL CORE SPECIMENS FROM MAIN PASS FIELD (DEPTH 8585, 8593 AND 8630 FEET) |

TABLE 6

Test Results

| TEST No. | ACID TESTED | MATERIAL TESTED | PERCENT SOLUBILITY |
|---|---|---|---|
| 1 | 1 | A | 78.18 |
| 2 | 2 | A | 76.21 |
| 3 | 3 | A | 84.83 |
| 4 | 4 | A | 78.30 |
| 5 | 5 | A | 64.12 |
| 6 | 6 | A | 77.86 |
| 7 | 7 | A | 90.31 |
| 8 | 1 | B | 30.59 |
| 9 | 2 | B | 32.22 |
| 10 | 3 | B | 39.96 |
| 11 | 4 | B | 30.55 |
| 12 | 5 | B | 22.74 |
| 13 | 6 | B | 24.67 |
| 14 | 7 | B | 41.45 |
| 15 | 1 | C | 84.26 |
| 16 | 2 | C | 88.27 |
| 17 | 3 | C | 93.05 |
| 18 | 4 | C | 82.38 |
| 19 | 5 | C | 73.10 |
| 20 | 6 | C | 85.12 |
| 21 | 7 | C | 94.98 |
| 22 | 8 | C | 24.56 |
| 23 | 1 | D | 51.11 |
| 24 | 2 | D | 53.25 |
| 25 | 3 | D | 54.92 |
| 26 | 4 | D | 50.22 |
| 27 | 5 | D | 58.60 |
| 28 | 6 | D | 61.50 |
| 29 | 7 | D | 65.90 |
| 30 | 8 | D | 23.49 |
| 31 | 1 | E | 51.1 |
| 32 | 2 | E | 51.0 |
| 33 | 3 | E | 59.3 |
| 34 | 4 | E | 55.2 |
| 35 | 5 | E | 54.4 |
| 36 | 6 | E | 59.9 |
| 37 | 7 | E | 65.98 |
| 38 | 8 | E | 21.2 |

The acid treatment solutions of the invention were particularly effective in dissolving silica materials of the type which have been problematical in the past. The results of the laboratory experiments discussed above were confirmed in an actual case history.

CASE HISTORY

Main Pass 299 is located in the Gulf of Mexico 90 miles southeast of New Orleans, La. in 200–240 feet of water. The field was discovered in 1962 when a discovery well was drilled to a depth of 9000 feet encountering 120 foot of oil in the Upper Miocene. Main Pass 299 is a piercement-type salt dome with pay trapped by faults and unconformities on all flanks.

Previous treatments in the Man Pass 299 Field have shown that acidizing zeolite-bearing sandstones with conventional acid systems have been used with limited success.

An acid system was needed to address the mineralogical complexities that are seen in this field as well as in many other Gulf of Mexico sandstones.

Various types and blends of acids including HCl, Acetic, Formic, regular and retarded mud acids have been utilized with varying degrees of success. Previous studies have shown that acidizing sandstones containing zeolite minerals can result in the precipitation of aluminosilicate gels. Zeolites have been identified in numerous wells in this field and many of the wells have experienced poor production performance. Historically, wells in this field have not responded well to acid treatments.

X-ray diffraction (XRD) has revealed high concentrations of cliniptilolite and analcime distributed sporadically throughout the Main Pass 299 sands and may be found in very thin laminations. 68 cores from the different sands in Main Pass 299 were analyzed by XRD, and 43 of the cores have zeolites present. Cliniptilolite was measured to be as high as 29% in some cores, and analcime was measured to be as high as 23%. Other cores showed trace amounts of the zeolite minerals; however, zeolites even in small amounts can be extremely damaging when acidized with the wrong acid. HCl had been pumped on numerous wells in Main Pass 299 before it was identified that HCl has a harmful reaction on formations containing zeolites. Main Pas 299 zeolite-bearing sands exhibited increased treating pressures, or locked up altogether, when HCl and HCl/HF treatments were pumped in the past. Those treatments resulted in damaged formations and less than potential production.

Three wells in the Main Pass 299 field were treated progressively. The first well treated was the BA-12, the second well treated was the BA-4, and the third well treated was the DA-8.

The BA-12 well treatment zone was from 8096'–8097' MC (201 feet). The acid treatment that was designed for the BA-12 well included: a xylene preflush, an 8% NH$_4$Cl preflush, a 25 gpf 10% acetic preflush, a 25 gpf 10% Citric/1.5% HF, a 50 gpf 8% NH$_4$Cl postflush and nitrogen diverters. However, the BA-12 Well was so severely damaged that the acid could not be injected. Instead of sending the acid back to base, a decision was made to pump the already-mixed acid into the BA-4 Well.

The 8650' treatment zone in the BA-4 Well was the next candidate and a Citric/1% HF acid treatment was pumped. The original acid design for the BA-4 had included a temporary water shut-off procedure to avoid stimulating only the oil producing sands with a Citric/HF treatment. The BA-4 Well was completed in 1991; the drive mechanism—a weak water drive. There were no previous acid treatments performed on this well. Sidewall core analyzes showed permeability of the treated zone to be 290 mD and porosity to be 29%. XRD showed this zone to contain 13% cliniptilolite, 11% clays, 5% feldspars, and 71% quartz. BHT at time of treatment was 169° F. and BHP was 2068 psi. Original pressure had been 2903 psi in 1991. Decline curve analysis showed the BA-4 production to be steadily declining. Prior to this acid treatment, this well produced 51 BOPD and 145 BFPD with a 65% water cut.

The treatment zone for the BA-4 Well was from 8582'–8706' MD (124 ft.) The acid treatment was introduced into the BA-4 Well at 1.5 BPM with surface treating pressures limited to 1200 psi. The acid design that was actually pumped included: a xylene preflush, an 8% NH$_4$Cl preflush, 3352 gallons of 10% acetic preflush, 6700 gallons of 10%Citric/1.5%HF, 6704 gallons of 8% NH$_4$Cl postflush and nitrogen diverters. Additives included corrosion inhibitor, iron control, mutual solvent, and non-emulsifier. A 5% ammonium chloride and 1.5% phosphonic acid had been added to the Citric/HF stage, and clay stabilizer had been added to the post-flush.

The BA-12 acid treatment that was pumped into the BA-4 Well did stimulate the BA-4 oil production. Because the intended water-avoidance stimulation treatment had not been pumped on the BA-4 as designed, water production increased from 65% to 90% and the BA-4 Well watered out. However, total fluid production from the BA-4 Well had increased from 145 BPD to 183 BPD. Even though the Citric/HF treatment increased water production on the BA-4 We4ll, the total fluid production increased approximately 20%. This was in improved result, since previous acid designs in this field had either caused damage or had no affect at all.

Because the results of the Citric/HF treatment of the BA-4 well were encouraging, the DA-8 well was selected as the next candidate. For this well, a treatment of Citric/2% HF with HV additive was pumped. Again, the results were promising with increased production evident.

An invention has been provided with several advantages. The treatment fluids of the invention enhance the production of hydrocarbons from hydrocarbon bearing siliceous formations, particularly those containing zeolites. The treatment method is especially effective if applied prior to gravel packing or fracturing. The treatment solutions of the invention have an effectiveness of stimulating a siliceous formation comparable to known acid systems but have the advantage of providing such stimulation without forming harmful precipitates or gelling of zeolites in these sensitive formations.

Although the invention has been described with reference to a specific embodiment, this descriptions is not to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method of enhancing the productivity of hydrocarbons from a hydrocarbon bearing siliceous formation, the method comprising contacting said formation with a treatment solution prior to gravel packing or hydraulic fracturing, wherein said treatment solution comprises citric acid, a phosphonate compound, and hydrofluoric acid.

2. The method of claim 1, wherein said treatment solution further comprises ammonium salts.

3. The method of claim 1, wherein said formation is contacted with a preflush prior to contacting the formation with the treatment solution.

4. The method of claim 3, wherein said preflush comprises citric and phosphonate compounds.

5. The method of claim 3, wherein said preflush comprises hydrochloric acid.

6. The method of claim 3, wherein said preflush comprises formic acid.

7. The method of claim 3, wherein said preflush comprises acetic acid.

8. A method of enhancing the productivity of hydrocarbons from a hydrocarbon bearing siliceous formation having zeolites present in the formation to be treated which are sensitive to hydrofluoric acid, the method comprising contacting said formation with a treatment solution prior to gravel packing or hydraulic fracturing wherein said treatment solution comprises:

about 1 to 50% citric acid up to about 20% hydrofluoric acid; and about 1 to 50% phosphonate compound.

9. The method of claim 8, wherein said treatment solution further comprises ammonium salts.

10. The method of claim 8, wherein said formation is contacted with a preflush prior to contacting the formation with the treatment solution.

11. The method of claim 10, wherein said preflush comprises citric and phosphonate compounds.

12. The method of claim 10, wherein said preflush comprises hydrochloric acid.

13. The method of claim 10, wherein said preflush comprises formic acid.

14. The method of claim 10, wherein said preflush comprises acetic acid.

15. A pretreatment solution used to treat siliceous formations prior to gravel packing or hydraulic fracturing for enhancing the productivity of hydrocarbons from a hydrocarbon bearing siliceous formation comprising:

about 1 to 50% citric acid up to about 20% hydrofluoric acid; and about 0.5 to 50% phosphonate compound.

16. The solution of claim 15, further comprising ammonium chloride.

17. The solution of claim 15, wherein the citric acid is present in the range from about 5 to 15%, the hydrofluoric acid is present in the range from about 0.5 to 6% and the phosphonate compound is present in the range from about 0.5 to 5%.

* * * * *